United States Patent [19]

Kish, III

[11] Patent Number: 4,740,962

[45] Date of Patent: Apr. 26, 1988

[54] SYNCHRONIZER FOR TIME DIVISION MULTIPLEXED DATA

[75] Inventor: Joseph Kish, III, Mesa, Ariz.

[73] Assignee: Motorola, Inc., Schaumburg, Ill.

[21] Appl. No.: 812,691

[22] Filed: Dec. 23, 1985

[51] Int. Cl.⁴ .......................... H04J 3/06; H04L 7/00
[52] U.S. Cl. .................................. 370/102; 370/100; 375/116
[58] Field of Search ................. 370/100, 102, 84, 108; 375/116, 112

[56] References Cited

U.S. PATENT DOCUMENTS

| | | | |
|---|---|---|---|
| 3,946,161 | 3/1976 | Husted et al. | 375/112 |
| 4,072,826 | 2/1978 | Aveneau | 179/15 AF |
| 4,224,473 | 9/1980 | Kaul et al. | 370/102 |
| 4,301,534 | 11/1981 | Genter et al. | 370/105 |
| 4,323,790 | 4/1982 | Dunning et al. | 370/102 |
| 4,347,606 | 8/1982 | Hoogeveene | 370/105 |
| 4,347,620 | 8/1982 | Black et al. | 370/102 |
| 4,353,387 | 10/1982 | Portejoie et al. | 370/102 |
| 4,397,020 | 8/1983 | Howson | 375/116 |
| 4,414,676 | 11/1983 | Kraul et al. | 375/116 |
| 4,596,026 | 6/1986 | Cease et al. | 370/102 |
| 4,611,336 | 9/1986 | Fryer | 375/112 |
| 4,667,324 | 5/1987 | Graves | 375/112 |
| 4,674,088 | 6/1987 | Grover | 370/102 |

Primary Examiner—Douglas W. Olms
Assistant Examiner—Curtis Kuntz
Attorney, Agent, or Firm—Maurice J. Jones, Jr.

[57] ABSTRACT

A circuit which finds a synchronization pattern and provides synchronized data from incoming time division multiplexed data is disclosed. The incoming data includes an incoming clock signal used in saving the incoming data in a FIFO memory. A local clock, which is isolated from the incoming clock but exhibits substantially the same rate as the incoming clock, retrieves output data from the FIFO memory. A series of bits from the output data which includes bits having relative bit positions that correspond to the bit positions of the synchronization pattern are examined for the occurrence of the synchronization pattern. If the synchronization pattern is not found, a dummy bit is added to the incoming data stream. The added dummy bit causes the quantity of data stored in the FIFO memory to increase the delays the output data by one bit relative to the output data prior to the addition of the dummy bit. The above described process repeats until synchronization is achieved.

18 Claims, 2 Drawing Sheets

SYNCHRONIZER FOR TIME DIVISION MULTIPLEXED DATA

STATEMENT OF GOVERNMENT INTEREST

The Government has rights in this invention pursuant to contract No. DAAB07-82-C-J239 awarded by the Army.

BACKGROUND OF THE INVENTION

This invention relates generally to digital data transmission systems. Specifically, this invention relates to systems which extract time division multiplexed (TDM) data frames from a data stream. More specifically, the present invention relates to systems which rely on a synchronizer circuit to identify the correct timing associated with particular frames.

Synchronizing circuits typically monitor an incoming data stream for the occurrence of a predetermined synchronization pattern. It is desirable to identify the synchronization pattern quickly. After noting instances in time when synchronization patterns occur, the synchronizer possesses the information needed to de-multiplex the data stream.

Typically, synchronizers represent relatively complicated circuits because they modify local timing of the synchronizer to match the timing presented with the incoming data stream. Some synchronizers attempt to identify synchronization patterns more quickly than necessary for many applications and increase circuit complexity as a result. Other synchronizers utilize programmable microcomputers which identify synchronization patterns slowly and require relatively complicated circuits for their implementation. This excess complication causes undesirably expensive and unreliable synchronizers.

SUMMARY OF THE INVENTION

Accordingly, it is an object of the present invention to provide an improved synchronizer which represents a relatively simple circuit.

Another object of the present invention concerns providing an improved synchronizer which adjusts the timing of the incoming data to match local timing of the synchronizer.

Yet another object of the present invention concerns providing an improved synchronizer which achieves a desirable compromise between speed of synchronization and circuit complexity.

The above and other objects and advantages of the present invention are carried out in one form by a synchronizer that includes a FIFO memory which accepts data from an incoming data stream at a predetermined rate. The FIFO additionally supplies an output data stream at the same predetermined rate to a register which saves a predetermined series of bits from the output data stream. A comparing means compares the series of bits saved in the register with a predetermined synchronization pattern. When the comparing means indicates that the series of bits saved in the register does not match the synchronization pattern, an adding means adds a dummy bit to the incoming data stream.

BRIEF DESCRIPTION OF THE DRAWINGS

A more complete understanding of the present invention may be derived by reference to the detailed description and the claims when considered in connection with the accompanying drawings wherein:

DETAILED DESCRIPTION OF THE PREFERRED EMBODIMENT

Figure 1:
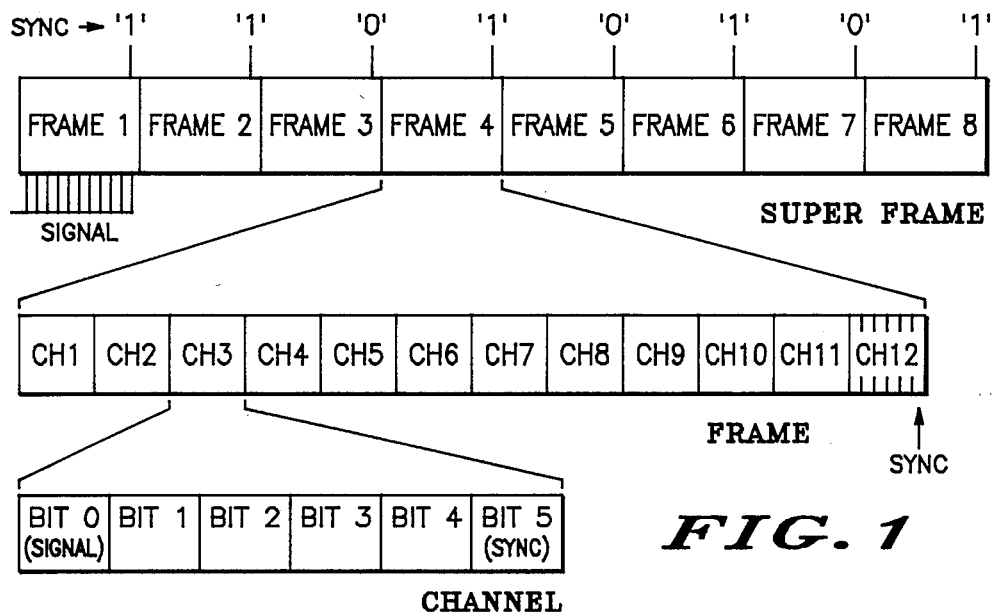
FIG. 1 diagrams a definition of an incoming data stream upon which the present invention operates.

FIG. 1 defines one embodiment of a time division multiplexed (TDM) data stream upon which the present invention operates. A "super-frame" represents 576 consecutive, serially transmitted bits of data. In the preferred embodiment this data stream occurs at a rate of 576K bits/sec. The super-frame is partitioned into eight, 72-bit frames labeled frame 1, frame 2, frame 3, frame 4, frame 5, frame 6, frame 7, and frame 8. Frame 8 occurs first, and frames 7 to 1 follow. After frame 1 occurs, the super-frame repeats. The data rate remains substantially constant over the entire super-frame.

Each of frames 1–8 is partitioned into twelve, 6-bit channels, or phones, labeled channel 1, channel 2, channel 3, channel 4, channel 5, channel 6, channel 7, channel 8, channel 9, channel 10, channel 11, and channel 12. Channel 12 occurs first within a frame, and channels 11 to 1 follow.

Each of channels 1 through 12 is partitioned into six bits labeled bit 0, bit 1, bit 2, bit 3, bit 4, and bit 5. Bit 5 occurs first and represents the most significant bit of the channel. Bit 5 is followed by bits 4 to 0, and bit 0 represents the least significant bit of the channel.

Bit 5 of each channel 12 from each frame contains synchronization information. This synchronization information represents one bit of a synchronization pattern. The preferred embodiment utilizes a synchronization pattern, or sync byte, having the value "1010 1011" (AB-hex) taken from frames 8 to 1, respectively. In other words bit 5 of channel 12 from frame 8 contains a logical 1, bit 5 of channel 12 from frame 7 contains a logical 0, bit 5 of channel 12 from frame 6 contains a logical 1, and so on until bit 5 of channel 12 from frame 1 contains a logical 1.

The sync byte AB-hex utilized by the preferred embodiment represents a unambiguous synchronization pattern. For an unambiguous synchronization pattern, the synchronization bits derived from frames in any consecutive order other than frames 8-7-6-5-4-3-2-1, such as frames 5-4-3-2-1-8-7-6, fail to produce the unambiguous synchronization pattern. Accordingly, once the unambiguous sync byte has been detected, frames 1–8 within a superframe and channels 1–12 within any frame may be demultiplexed from the incoming data stream using techniques known to those skilled in the art.

Frame 1 of the super-frame may contain signaling information, such as "ring" or "on-hook" information. Bit 0 of each channel of frame 1 contains this signaling information. Since an unambiguous synchronization pattern is used, frame 1 may be distinguished from frames 2–7 to permit extraction of the signaling information.

Figure 2:
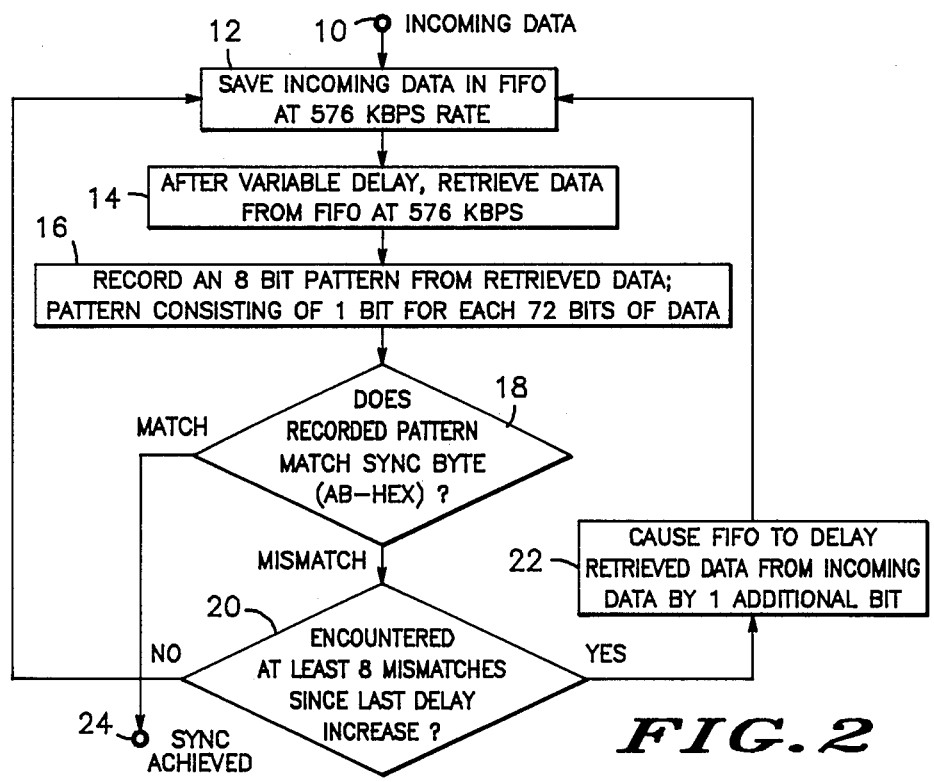
FIG. 2 shows a logic diagram of the present invention.

FIG. 2 shows a logic diagram of operations performed by the present invention. An incoming data stream applied at an input 10 is utilized by an operation 12. Operation 12 routes, or saves, the incoming data stream into a first-in-first-out (FIFO) memory (not shown). The incoming data stream enters the FIFO memory at the data rate of the incoming data, which in the preferred embodiment is 576K bits/sec.

After operation 12 saves the incoming data in the FIFO memory, an operation 14 retrieves data from the FIFO memory. The retrieving of data from the FIFO memory occurs at substantially the same rate at which incoming data enters the FIFO memory. Thus, for each bit of data stored in the FIFO memory, a bit of data is retrieved from the FIFO memory. The quantity of data stored within the FIFO memory remains substantially constant. However, due to the operation of the FIFO memory, a given bit of data entered into the FIFO memory must wait until previously entered bits exit before the given bit may exit. Thus, the amount of time which transpires between a bit entering and exiting the FIFO memory depends on the quantity of bits stored in the FIFO memory when operation 12 occurs.

After operation 14 occurs an operation 16 monitors an output data stream which represents the data output from the FIFO memory. Operation 16 records, or saves, a series of bits from the output data stream. Operation 16 records one bit, for example the first bit, for each N bits of data in the data stream, where N equals the number of bits in a frame. In the preferred embodiment for each 72 bits of data in the output data stream, operation 16 saves one bit of data and then ignores 71 bits of data. Thus, operation 16 saves data at a rate substantially equal to the rate at which the synchronization pattern occurs in the incoming data stream.

Operation 16 retains only a total of M bits from the output data stream, where M represents the number of bits in the synchronization pattern. In the preferred embodiment only the most recently occurring eight of the saved bits are retained. Thus, operation 16 saves a byte of data for each super-frame, and the byte consists of bits which occur at a rate equal to the rate at which synchronization bits occur in the incoming data.

Operation 18 tests the pattern recorded in operation 16 against a predetermined synchronization pattern, such as the sync byte AB-hex used in the preferred embodiment. If operation 16 saved a pattern which matches the sync pattern, then synchronization has been achieved, as indicated at output 24.

On the other hand, if operation 16 saved a pattern which does not match the sync pattern, then synchronization has not been achieved and operation 20 occurs. Since the preferred embodiment operates with an unambiguous sync byte, sync bits may be encountered in an order which fails to produce the sync byte. This situation occurs when the saved pattern consists of sync bits saved from frames in an order other than frames 8-7-6-5-4-3-2-1. Accordingly, operation 20 provides M opportunities for operation 18 to indicate a match with the synchronization pattern before permitting a synchronization action to be taken, where M equals the number of bits contained in the synchronization pattern. If M, which equals eight in the preferred embodiment, consecutive mismatches have not yet occurred, then operations 12 through 20 repeat until either a match occurs or M consecutive mismatches occur.

When permitted by operation 20, operation 22 takes the action which will eventually lead to synchronization with the incoming data stream. Thus, operation 22 causes the quantity of data in the FIFO memory to increase by one bit. Consequently, the increase in data quantity increases the delay between the incoming data stream and the output data stream by one bit. Further, the pattern saved in operation 16, after operation 22 occurs, consists of bits positioned in the data streams adjacent to and one bit later than the bits which were recorded in previous operations 16.

After operation 22, operations 12 through 20 repeat until synchronization occurs. Synchronization will eventually occur when a properly formatted incoming data stream is received because common positions in each of eight consecutive frames for each bit position are systematically examined for the synchronization pattern.

Figure 3:
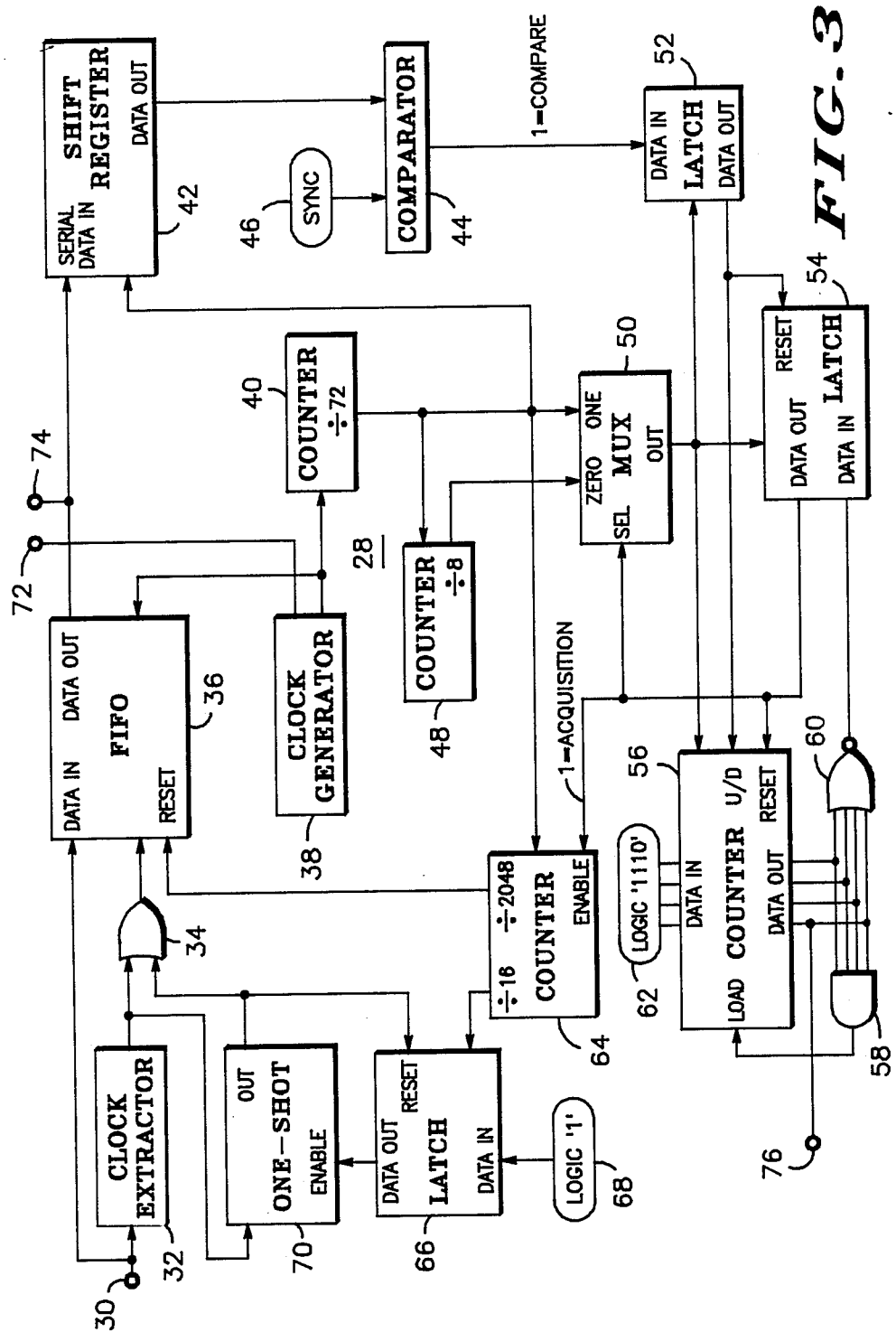
FIG. 3 shows a block diagram of the present invention.

FIG. 3 shows a block diagram of a synchronizer 28 which implements the preferred embodiment of the present invention. As shown in FIG. 3, synchronizer 28 receives the incoming data stream at a terminal 30. Terminal 30 couples to an input of a clock extractor circuit 32 and a data input of a FIFO memory 36. An output of clock extractor 32 couples to a clock input of an astable multivibrator, or one shot, 70 and to a first input of a two-input logical OR device 34. An output from one shot 70 couples to a reset input of a latch 66 and a second input of OR device 34. An output of OR device 34 couples to a write clock input of FIFO memory 36. A data output of FIFO memory 36 couples to a terminal 74 and a serial data input of a shift register 42. Register 42 represents an eight-bit, serial-in/parallel-out shift register.

A clock generator 38 has a first output which couples to a terminal 72. Clock generator 38 has a second output which couples to a clock input of FIFO memory 36 and to a read clock input of a counter 40. Counter 40 divides the signal presented at its clock input by 72 and provides the divided signal at an output which couples to clock inputs of shift register 42, a counter 48, a counter 64, and a "one" input of a multiplexer 50. A data output from shift register 42 couples to a first input of a comparator 44. A second input of comparator 44 couples to a terminal 46, which is adapted to receive logical voltage levels corresponding to a predetermined synchronization pattern, such as AB-hex. An output of comparator 44 couples to a data input of a latch 52.

Counter 48 divides the signal presented at its clock input by eight and provides the divided signal at an output which couples to a "zero" input of multiplexer 50. An output of multiplexer 50 couples to clock inputs of latch 52, a latch 54, and a counter 56. A data output of latch 52 couples to a reset input of latch 54 and an up/down input of counter 56. A data output of latch 54 couples to a reset input of counter 56, a select input of multiplexer 50, and an enable input of counter 64.

Counter 56 represents a four bit counter which counts between values of 0 and F-hex, inclusive. Four data inputs of counter 56 couple to terminals adapted to receive voltage levels corresponding to a penultimate value for counter 56, such as an E-hex value for a four bit counter. Four data outputs of counter 56 couple to four inputs of four-input logical AND device 58 and to four inputs of four-input logical NOR device 60. An output from NOR device 60 couples to a data input of latch 54, and an output from AND device 58 couples to a load input of counter 56. The most significant of the four data outputs from counter 56 couples to a terminal 76.

A divide-by-16 output of counter 64 couples to a clock input of latch 66. A divide-by-2048 output of counter 64 couples to a reset input of FIFO memory 36. A data input of latch 66 couples to a terminal 68 which is adapted to receive a logical 1 voltage level. A data output of latch 66 couples to an enable input of one shot 70.

Synchronizer 28 operates on an incoming data stream in which data and a clock signal are intermixed. Clock extractor 32 represents a conventional circuit known to those skilled in the art which extracts the clock from the incoming data stream. This clock, which is derived from the incoming data stream, clocks data into FIFO memory 36. Thus, FIFO memory 36 receives the incoming data stream at the rate which characterizes the incoming data stream.

Clock generator 38 provides a local clock and local timing for synchronizer 28. Clock generator 38 is isolated from the clock derived from the incoming data stream. The output from clock generator 38 which couples to the read clock input of FIFO memory 36 presents a clock signal at a rate substantially equal to the rate of the incoming data stream. However, since clock generator 38 is isolated from the incoming data stream, the clock signals produced thereby may experience slight frequency and phase differences relative to the incoming data stream. Nevertheless, an output data stream is retrieved from FIFO memory 36 at substantially the rate that the incoming data stream is routed into FIFO memory 36.

Terminal 74 provides the output data stream to other circuits (not shown) which de-multiplex the channels and frames once synchronization occurs. Terminal 72 provides additional local timing signals which aid de-multiplexing the channels and frames.

Counter 40 provides a signal which activates once each 72 bits of data from the output data stream. This rate represents the rate at which sync bits occur within the data streams. Thus, counter 40 provides the clock signal which shift register 42 uses to save a series of bits from the output data stream.

Synchronizer 28 operates in an acquisition mode where synchronization has not yet occurred and in a maintenance mode where synchronization has occurred and tests are performed to verify that synchronization is maintained. During the acquisition mode the data output of latch 54 exhibits a logical 1 level which enables counter 64, holds counter 56 reset, and causes multiplexer 50 to select the "one" input for its output.

During the acquisition mode a signal produced by counter 40, which signal activates once every 72 bits of data output from FIFO memory 36, clocks latch 52. Comparator 44 compares the pattern of bits saved in register 42 with the predetermined synchronization pattern applied at terminal 46 and outputs a logical 1 when a match occurs. Latch 52 samples the results of this comparison once every 72 bits of output stream data during the acquisition mode. The data output from latch 52 refrains from resetting latch 54 so long as no match is indicated. Consequently, the acquisition mode is maintained so long as no match is indicated in the data output of latch 52.

During the acquisition mode counter 64 counts at a rate equivalent to one increment for each frame of data output by FIFO memory 36. Thus, the divide-by-16 output from counter 64 provides a signal which activates when synchronizer 28 remains in the acquisition mode, in which comparator 44 indicates mismatches, for 16 consecutive frames. The activation of the divide-by-16 output from counter 64 causes latch 66 to clock a logical 1 to its output and enable one shot 70. Once one shot 70 becomes enabled, the next occurring falling edge from clock extractor 32 causes one shot 70 to trigger and produce a pulse which goes through OR device 34 and clocks a dummy bit of data into FIFO memory 36. The pulse produced by one shot 70 additionally resets latch 66, disabling one shot 70 from producing other pulses within the next 16 frames.

The pulse produced by one shot 70 causes the dummy bit to be added to the incoming data stream as the incoming data stream goes into FIFO memory 36. As discussed above in connection with FIG. 2, the quantity of data stored within FIFO memory 36 remains substantially constant because the output data stream and the incoming data stream occur at substantially the same data rate. However, the addition of the dummy bit into the incoming data stream increases the quantity of data stored within FIFO memory 36 by one bit. Consequently, the delay between the output data stream and the incoming data stream increases by one bit.

The dummy bit need not exhibit a particular logic level. Since synchronization has not yet occurred, all bits stored within FIFO memory 36 will be ignored. However, the timing of the pulse produced by one shot 70 is controlled so as not to interfere with the normal clocking of the incoming data stream into FIFO memory 36 using the clock signal extracted in clock extractor 32. Thus, the point in time at which the dummy bit is added to the incoming data stream is referenced to the clock derived from the incoming data stream by triggering one shot 70 from the incoming data stream clock.

One dummy bit adds to the incoming data stream for each 16 frames of data until synchronization occurs. However, synchronization may not occur when synchronizer 28 encounters an improperly formatted incoming data stream. Accordingly, the divide-by-2048 output from counter 64 initializes, or resets, FIFO memory 36 after an occurrence of time equivalent to the passage of 2048 frames of data without detecting the synchronization pattern. The initialization of FIFO memory 36 erases all data stored in FIFO memory 36, setting the quantity of data stored in FIFO memory 36 to zero.

When the synchronization pattern is detected, the data output from latch 54 exhibits a logical 0 level, and synchronizer 28 enters the maintenance mode. Counter 64 becomes disabled and prevents further dummy bits from being added to the incoming data stream or initialization of FIFO memory 36. Multiplexer 50 selects the "zero" input as its output, and counter 56 is no longer reset. Counter 48 generates a signal which activates at a rate of one activation for each super-frame of data. This equals one activation for each received sync byte. Since multiplexer 50 selects its "zero" input which is driven by counter 48, latch 52 samples the output from comparator 44 only when it expects a sync byte in register 42. The data output from latch 52 remains at a logical 1 level so long as sync bytes continue to be detected at the sample which occurs once each super-frame.

The logical 1 level output from latch 52 causes counter 56 to increment. Thus, counter 56 increments once each super-frame for which a sync byte is detected. Counter 56 starts incrementing from a value of 0. When counter 56 increments to a value of 8, the most significant bit of data output from counter 56 may advantageously indicate at terminal 76 that valid data may be extracted from terminal 74. When counter 56 increments to a value of F-hex, the value of E-hex is reloaded into counter 56 and counter 56 is prevented from overflowing and causing a 0 output value.

If a latch 52 fails to indicate the detection of a sync byte while synchronizer 28 is in the maintenance mode, counter 56 decrements. So long as the value in counter 56 is greater than 8, a mere single indication that the synchronization pattern did not occur will not cause synchronizer 28 to remove an indication from terminal 76 that valid data may be removed from terminal 74. Additionally, synchronizer 28 remains in the maintenance mode until counter 56 decrements to 0 and causes latch 54 to change state to a logical 1 level.

The foregoing description uses a preferred embodiment to illustrate the present invention. However, those skilled in the art will recognize that changes and modifications may be made in this embodiment without departing from the scope of the present invention. For example, one of ordinary skill in the art would recognize that the particular incoming data stream defined in FIG. 1 may be significantly modified as to the definitions of the channels, frames, super-frames, data rates, sync byte, sync byte bit positions, and the like, causing corresponding modifications to the present invention without departing from the scope of the invention. Further, many different circuits can be constructed by those skilled in the art to perform the specific functions described in connection with FIG. 3. These and other changes and modifications obvious to those skilled in the art are intended to be included within the scope of this invention.

What is claimed is:

1. A synchronizer for time division multiplexed data, said synchronizer comprising:
   a FIFO memory having an input configured to receive an incoming data stream occurring at a predetermined data rate and having an output configured to supply an output data stream at a data rate substantially equal to the predetermined data rate of the incoming stream;
   a register having an input coupled to the output of said FIFO memory, said register being for saving a predetermined series of bits from the output data stream, and said register having an output;
   means, having an input coupled to said register output, for comparing the series of bits in said register with a predetermined synchronization pattern, said comparing means having an output for providing a comparison output; and
   means, coupled to said comparing means output and said FIFO memory input, for adding a dummy bit to the incoming data stream when said comparison output indicates that the synchronization pattern did not occur.

2. A synchronizer as claimed in claim 1 additionally comprising means, coupled to said adding means, for initializing said FIFO memory when said comparing means indicates that the synchronization pattern did not occur within a predetermined amount of time.

3. A synchronizer as claimed in claim 1 wherein:
   the incoming data stream includes an incoming clock derived from the received data stream;
   said FIFO memory has a clock input adapted to receive the incoming clock; and
   said adding means comprises an astable multivibrator having an input trigger adapted to receive the incoming clock and having an output coupled to the clock input of said FIFO memory.

4. A synchronizer as claimed in claim 1 wherein said comparing means is configured to compare the series of bits in said register with the predetermined synchronization pattern only once for a first predetermined number of bits of data from the output data stream.

5. A synchronizer as claimed in claim 4 wherein said adding means is configured to add the dummy bit to the incoming data stream only once for a second predetermined number of bits of data from the output data stream, said second predetermined number being greater than the first predetermined number, and said addition occurring when said comparing means indicates that the series of bits in said register does not match the synchronization pattern.

6. A synchronizer as claimed in claim 4 wherein:
   said synchronizer operates in an acquisition mode where said synchronizer has not achieved synchronization with the incoming data stream and in a maintenance mode where said synchronizer has achieved synchronization with the incoming data stream; and
   said comparing means is configured to compare the series of bits in said register with the predetermined synchronization pattern only once for a second predetermined number of bits of data from the output data stream during the maintenance mode, said second predetermined number being greater than the first predetermined number.

7. A synchronizer as claimed in claim 1 wherein:
   the incoming data stream includes an incoming clock derived from the incoming data stream, the incoming clock causing bits of data to be loaded into said FIFO memory; and
   wherein said synchronizer additionally comprises a clock generator which is isolated from the incoming clock, couples to said FIFO memory, and provides a clock signal which removes data from said FIFO memory.

8. A method of synchronizing with an incoming time division multiplexed data stream, the method comprising the steps of:
   routing the incoming data stream into a FIFO memory;
   retrieving an output data stream from the FIFO memory;
   saving a predetermined series of bits of data from the output data stream;
   testing the series of bits from said saving step for an occurrence of a predetermined synchronization pattern; and
   adding a bit to the incoming data stream when said testing step indicates that the synchronization pattern has not occurred.

9. A method as claimed in claim 8 additionally comprising the step of repeating said saving, testing, and adding steps until said testing step indicates the occurrence of the synchronization pattern.

10. A method as claimed in claim 8 additionally comprising the step of initializing the FIFO memory when said testing step fails to indicate the occurrence of the synchronization pattern within a predetermined amount of time.

11. A method claimed in claim 8 additionally comprising the step of permitting operation of said testing step only once for a predetermined number of bits of the output data stream.

12. A method as claimed in claim 11 additionally comprising the step of permitting operation of said adding step only once in a predetermined number of occurrences of said testing step.

13. A method as claimed in claim 8 wherein:

said routing step includes the step of utilizing an incoming clock derived from the incoming data stream to route the incoming data stream into the FIFO memory; and said retrieving step includes the step of isolating a local clock exhibiting substantially the same rate as the incoming clock from the incoming clock.

14. A method as claimed in claim 13 wherein said adding step includes the step of referencing to the incoming clock a point in time at which the bit is added to the incoming data stream.

15. A method as claimed in claim 8 additionally comprising the steps of:

discriminating between an acquisition mode where synchronization has not been achieved and a maintenance mode where synchronization has been achieved; and permitting operation of said testing step only once in a first predetermined number of bits of data from the output data stream in the acquisition mode.

16. A method as claimed in claim 15 additionally coaprising the step of permitting operation of said testing step only once in a second predetermined number of bits of data from the output data stream in the maintenance mode, the second predetermined number being greater than the first predetermined number.

17. A method as claimed in claim 15 additionally comprising the step of permitting continuation of the maintenance mode when said testing step provides a single indication that the synchronization pattern did not occur.

18. A synchronizer for time division multiplexed data, said synchronizer comprising:

a FIFO memory having an input configured to receive an incoming data stream occurring at a predetermined data rate and having an output configured to supply an output data stress at a data rate substantially equal to the predetermined data rate of the incoming data stream;

a shift register having an input coupled to the output of said FIFO memory, said shift register being for saving a predetermined series of bits from the output data stream, and said shift register having an output;

a comparator having an input coupled to said shift register output and having an output, said comparator being for comparing the series of bits in said shift register with a predetermined synchronization pattern;

a latch having an input coupled to the output of said comparator and having an output, said latch being for sampling a signal generated by said comparator only once for a first predetermined number of bits of data from the output data stream; and means, having an input coupled to the output of said latch and having an output coupled to said FIFO memory input, for adding a dummy bit to the incoming data stream only once in a second predeteremined number of bits of data from the output data stream, said second predetermined number being greater than the first predetermined number, when the sampled output from said latch indicates that the series of bits saved in said shift register did not match the predetermined synchronization pattern.

* * * * *

UNITED STATES PATENT AND TRADEMARK OFFICE
CERTIFICATE OF CORRECTION

PATENT NO.  : 4,740,962
DATED       : April 26, 1988
INVENTOR(S) : Joseph Kish III It is certified that error appears in the above-identified patent and that said Letters Patent is hereby corrected as shown below:

Column 9, claim 16, line 22, change "coaprising" to --comprising--; and
Column 10, claim 18, line 4, change "stress" to --stream--.

Signed and Sealed this

Thirtieth Day of August, 1988

*Attest:*

DONALD J. QUIGG

*Attesting Officer*   *Commissioner of Patents and Trademarks*